US011961413B2

(12) United States Patent
Gihm et al.

(10) Patent No.: US 11,961,413 B2
(45) Date of Patent: Apr. 16, 2024

(54) METHOD, SYSTEM AND NON-TRANSITORY COMPUTER-READABLE RECORDING MEDIUM FOR SUPPORTING LISTENING

(71) Applicant: VITRUV INC., Seoul (KR)

(72) Inventors: Se Hoon Gihm, Seongnam-si (KR); Myung Hoon Ahn, Seongnam-si (KR); Tae Hyoung Oh, Seoul (KR); Du Seop Jung, Seongnam-si (KR)

(73) Assignee: VITRUV INC., Seoul (KR)

( * ) Notice: Subject to any disclaimer, the term of this patent is extended or adjusted under 35 U.S.C. 154(b) by 271 days.

(21) Appl. No.: 16/661,125

(22) Filed: Oct. 23, 2019

(65) Prior Publication Data

US 2020/0058234 A1 Feb. 20, 2020

Related U.S. Application Data

(63) Continuation of application No. PCT/KR2017/005912, filed on Jun. 7, 2017.

(30) Foreign Application Priority Data

Apr. 24, 2017 (KR) .................. 10-2017-0052532

(51) Int. Cl.
*G09B 19/06* (2006.01)
*G09B 7/06* (2006.01)
(Continued)

(52) U.S. Cl.
CPC .............. *G09B 19/06* (2013.01); *G09B 7/06* (2013.01); *G06Q 50/2057* (2013.01); *G09B 5/06* (2013.01); *G09B 19/04* (2013.01)

(58) Field of Classification Search
CPC .......... G09B 19/06; G09B 19/04; G09B 7/06; G09B 5/06; G06Q 50/2057
See application file for complete search history.

(56) References Cited

U.S. PATENT DOCUMENTS

2004/0029084 A1* 2/2004 Johnson .................. G09B 5/04
434/169
2005/0084829 A1* 4/2005 Peters ...................... G09B 7/00
434/157
(Continued)

FOREIGN PATENT DOCUMENTS

CN  86202098 U  3/1988
CN  1512300 A  7/2004
(Continued)

OTHER PUBLICATIONS

International Search Report for PCT/KR2017/005912 dated Jan. 12, 2018.

*Primary Examiner* — Jack Yip
(74) *Attorney, Agent, or Firm* — Dinsmore & Shohl LLP; Yongsok Choi, Esq.

(57) ABSTRACT

The present invention relates to a method, system and non-transitory computer-readable recording medium for assisting listening study. According to one aspect of the invention, there is provided a method for assisting listening study, comprising the steps of: determining a plurality of weak study sentences that a user who is provided with assessment study sentences by speech fails to understand, with reference to feedback from the user; determining at least some of pronunciations or pronunciation combinations commonly included in the plurality of weak study sentences as weak pronunciations or pronunciation combinations that the user fails to understand; and determining a compensatory study course to be provided to the user, with reference to the determined weak pronunciations or pronunciation combinations.

8 Claims, 3 Drawing Sheets

(51) Int. Cl.
*G06Q 50/20* (2012.01)
*G09B 5/06* (2006.01)
*G09B 19/04* (2006.01)

(56) References Cited

U.S. PATENT DOCUMENTS

| | | | | |
|---|---|---|---|---|
| 2009/0258333 | A1* | 10/2009 | Yu | G09B 19/06 434/157 |
| 2012/0046948 | A1* | 2/2012 | Leddy | G10L 13/033 704/E13.011 |
| 2015/0287339 | A1* | 10/2015 | Deshmukh | G09B 19/04 434/156 |

FOREIGN PATENT DOCUMENTS

| | | |
|---|---|---|
| JP | 2015004756 A | 1/2015 |
| JP | 2017021245 A | 1/2017 |
| KR | 20080081635 A | 9/2008 |
| KR | 100912483 B1 | 8/2009 |
| KR | 100981426 B1 | 9/2010 |
| KR | 1020100136202 A | 12/2010 |
| KR | 1020140004540 A | 1/2014 |
| TW | 200410170 A | 6/2004 |
| TW | 200422986 A | 11/2004 |
| WO | 2014172918 A1 | 10/2014 |

* cited by examiner

METHOD, SYSTEM AND NON-TRANSITORY COMPUTER-READABLE RECORDING MEDIUM FOR SUPPORTING LISTENING

CROSS-REFERENCE TO RELATED APPLICATION

This application is a continuation of International Application No. PCT/KR2017/005912 filed on Jun. 7, 2017 which claims priority to Korean Patent Application No. 10-2017-0052532 filed on Apr. 24, 2017, the entire contents of which are herein incorporated by reference.

FIELD OF THE INVENTION

The present invention relates to a method, system and non-transitory computer-readable recording medium for assisting listening study.

BACKGROUND

Language study can be largely divided into reading, writing, speaking, and listening. Since the core of all communications begins with listening to a language (i.e., whether one can hear the language well), a lot of research is being conducted on methods for assisting listening study to facilitate proper listening and understanding of characteristic sounds of the language.

As an example of related conventional techniques, there have been introduced study provision methods in which phonemic symbols of a foreign language to be studied are displayed on a screen while characteristic sounds of the foreign language corresponding to the phonemic symbols (i.e., standard phonetic pronunciations) are provided together, so that a learner can recognize the characteristic sounds of the foreign language, and in which words represented in phonemic symbols are provided to a learner together with characteristic sounds of a foreign language, so that the learner can study standard phonetic pronunciations in association with the phonetic symbols of the words.

However, according to the techniques that have been introduced so far, including the above conventional techniques, a user is unable to find out what pronunciations or pronunciation combinations of a studied language the user is weak in, and there are no means for intensive study of the weak pronunciations or pronunciation combinations.

In this regard, the inventor(s) present a technique for determining weak pronunciations or pronunciation combinations from weak study sentences of a user, and providing a study material associated with the weak pronunciations or pronunciation combinations to the user according to a compensatory study course.

SUMMARY OF THE INVENTION

One object of the present invention is to solve all the above-described problems in the prior art.

Another object of the invention is to refer to weak study sentences of a user to derive weak pronunciations or pronunciation combinations of the user commonly included in the weak study sentences.

Yet another object of the invention is to assist a user in intensive compensatory study of the user's weakness through a study material associated with weak pronunciations or pronunciation combinations of the user.

The representative configurations of the invention to achieve the above objects are described below.

According to one aspect of the invention, there is provided a method for assisting listening study, comprising the steps of: determining a plurality of weak study sentences that a user who is provided with assessment study sentences by speech fails to understand, with reference to feedback from the user; determining at least some of pronunciations or pronunciation combinations commonly included in the plurality of weak study sentences as weak pronunciations or pronunciation combinations that the user fails to understand; and determining a compensatory study course to be provided to the user, with reference to the determined weak pronunciations or pronunciation combinations.

According to another aspect of the invention, there is provided a system for assisting listening study, comprising: a weak study sentence determination unit for determining a plurality of weak study sentences that a user who is provided with assessment study sentences by speech fails to understand, with reference to feedback from the user; a weak pronunciation determination unit for determining at least some of pronunciations or pronunciation combinations commonly included in the plurality of weak study sentences as weak pronunciations or pronunciation combinations that the user fails to understand; and a compensatory study course determination unit for determining a compensatory study course to be provided to the user, with reference to the determined weak pronunciations or pronunciation combinations.

In addition, there are further provided other methods and systems to implement the invention, as well as non-transitory computer-readable recording media having stored thereon computer programs for executing the methods.

According to the invention, it is possible to refer to weak study sentences of a user to derive weak pronunciations or pronunciation combinations of the user commonly included in the weak study sentences.

According to the invention, it is possible to assist a user in intensive compensatory study of the user's weakness through a study material associated with weak pronunciations or pronunciation combinations of the user.

DETAILED DESCRIPTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the locations or arrangements of individual elements within each of the embodiments may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

Figure 1:
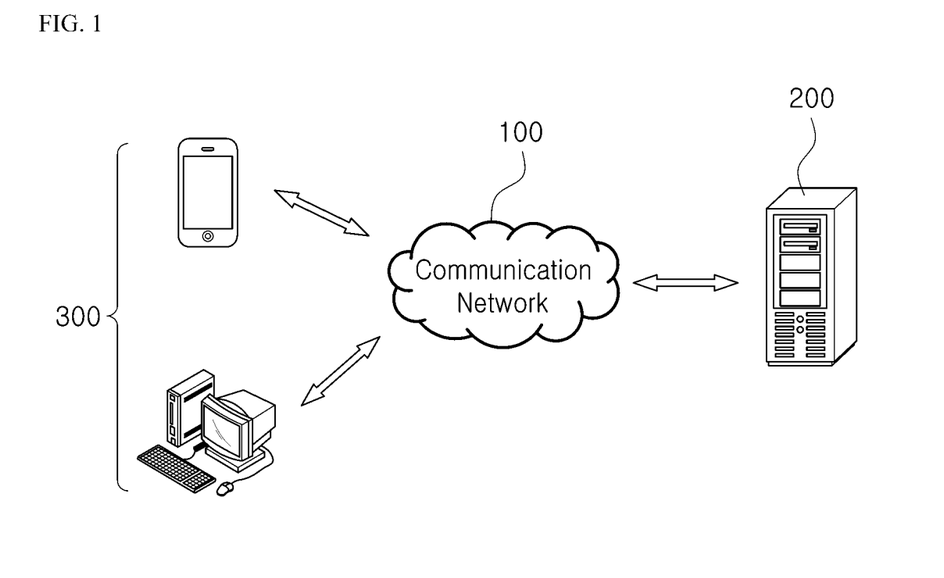
FIG. 1 schematically shows the configuration of an entire system for assisting listening study according to one embodiment of the invention.

FIG. 1 schematically shows the configuration of the entire system for assisting listening study according to one embodiment of the invention.

As shown in FIG. 1, the entire system according to one embodiment of the invention may comprise a communication network 100, a learning assistance system 200, and a user device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution communication, Bluetooth communication (e.g., Bluetooth Low Energy communication), infrared communication, and ultrasonic communication. As another example, the communication network 100 may be an optical communication network, at least a part of which may be implemented with a conventional communication scheme such as LiFi (Light Fidelity).

Next, the learning assistance system 200 according to one embodiment of the invention may communicate with the user device 300 to be described below via the communication network 100, and may function to determine a plurality of weak study sentences that a user who is provided with assessment study sentences by speech fails to understand, with reference to feedback from the user; determine at least some of pronunciations or pronunciation combinations commonly included in the plurality of weak study sentences as weak pronunciations or pronunciation combinations that the user fails to understand; and determine a compensatory study course to be provided to the user, with reference to the determined weak pronunciations or pronunciation combinations.

The configuration and function of the learning assistance system 200 according to the invention will be discussed in more detail below. Meanwhile, although the learning assistance system 200 has been described as above, the above description is illustrative and it will be apparent to those skilled in the art that at least a part of the functions or components required for the learning assistance system 200 may be implemented or included in the user device 300 to be described below or an external system (not shown), as necessary.

Next, the user device 300 according to one embodiment of the invention is digital equipment that may function to connect to and then communicate with the learning assistance system 200 via the communication network 100, and any type of portable digital equipment having a memory means and a microprocessor for computing capabilities, such as a smart phone and a tablet PC, may be adopted as the user device 300 according to the invention.

Meanwhile, according to one embodiment of the invention, the user device 300 may include an application to assist a user such that listening study assistance functions according to the invention may be provided to the user. The application may be downloaded from the learning assistance system 200 or an external application distribution server (not shown).

Configuration of the Learning Assistance System

Hereinafter, the internal configuration of the learning assistance system 200 crucial for implementing the invention and the functions of the respective components thereof will be discussed.

Figure 2:
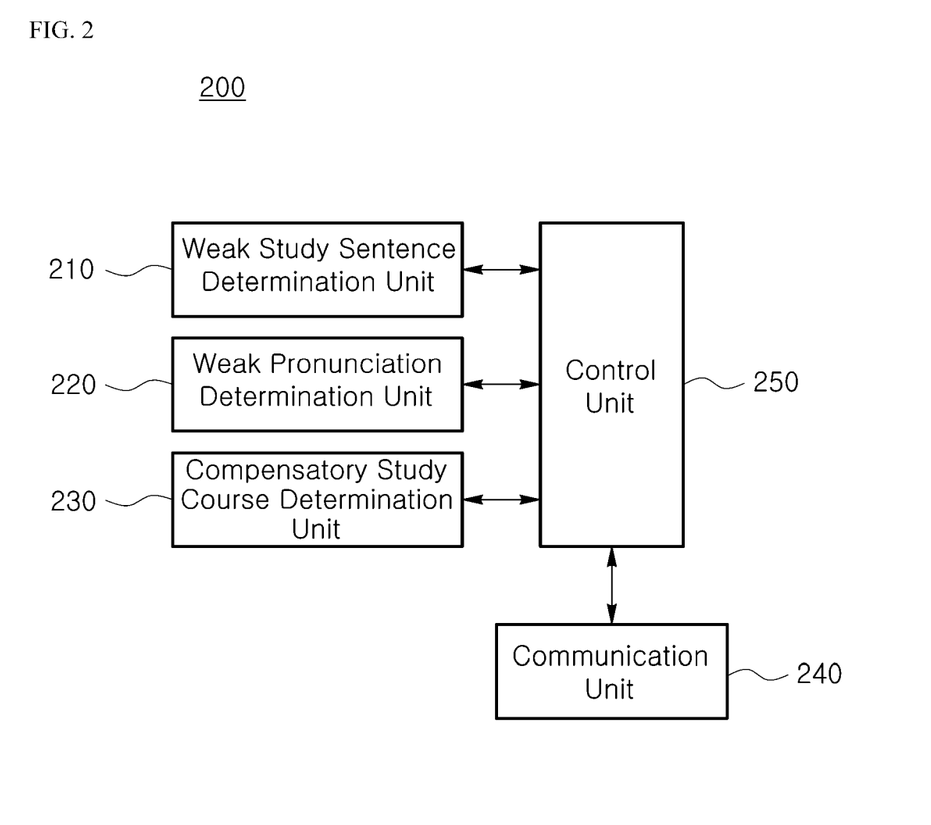
FIG. 2 illustratively shows the internal configuration of a learning assistance system according to one embodiment of the invention.

FIG. 2 illustratively shows the internal configuration of the learning assistance system 200 according to one embodiment of the invention.

The learning assistance system 200 according to one embodiment of the invention may be digital equipment having a memory means and a microprocessor for computing capabilities. The learning assistance system 200 may be a server system. As shown in FIG. 2, the learning assistance system 200 may comprise a weak study sentence determination unit 210, a weak pronunciation determination unit 220, a compensatory study course determination unit 230, a communication unit 240, and a control unit 250. According to one embodiment of the invention, at least some of the weak study sentence determination unit 210, the weak pronunciation determination unit 220, the compensatory study course determination unit 230, the communication unit 240, and the control unit 250 may be program modules to communicate with an external system. The program modules may be included in the learning assistance system 200 in the form of operating systems, application program modules and other program modules, while they may be physically stored in a variety of commonly known storage devices. Further, the program modules may also be stored in a remote storage device that may communicate with the learning assistance system 200. Meanwhile, such program modules may include, but not limited to, routines, subroutines, programs, objects, components, data structures and the like for performing specific tasks or executing specific abstract data types as will be described below in accordance with the invention.

First, the weak study sentence determination unit 210 according to one embodiment of the invention may refer to feedback from a user who is provided with assessment study sentences by speech, and determine a plurality of weak study sentences that the user fails to understand. The feedback according to one embodiment of the invention may be an answer of the user (e.g., the user listening to speech of an assessment study sentence and giving an answer or selecting a sentence based on understanding of the meaning thereof) to a question associated with the speech of the assessment study sentences (e.g., a question related to whether the user understands the speech of the assessment study sentences).

For example, the weak study sentence determination unit 210 according to one embodiment of the invention may determine assessment study sentences for which the user makes incorrect answers to questions associated with the speech of the assessment study sentences, or assessment study sentences which the user indicates failing to understand, as weak study sentences.

Meanwhile, the weak study sentence determination unit 210 according to one embodiment of the invention may also determine the weak study sentences with further reference to feedback from the user who is provided with the assessment study sentences by speech and then by text again.

Next, the weak pronunciation determination unit 220 according to one embodiment of the invention may refer to the determined weak study sentences, and determine at least some of pronunciations or pronunciation combinations commonly included in the weak study sentences as weak pronunciations or pronunciation combinations that the user fails to understand.

Specifically, according to one embodiment of the invention, the weak study sentences may be structured by predetermined codes representing pronunciations or pronunciation combinations included in each of the weak study sentences. The weak pronunciation determination unit 220 may compare at least one of pronunciations, pronunciation combinations, predetermined codes (e.g., Unicode) corresponding to the pronunciations, and combinations of the codes, which are included in each of the weak study sentences, thereby deriving at least one weak pronunciation or pronunciation combination that the user fails to understand, from the pronunciations or pronunciation combinations commonly included in the weak study sentences.

For example, when "boy is clever" and "I am a boy" are determined as weak study sentences that the user fails to understand, the weak pronunciation determination unit 220 according to one embodiment of the invention may determine "bɔɪ" that is commonly included in "bɔɪ ɪz klɛvər" (i.e., the phonetic symbols into which the former sentence is converted according to the International Phonetic Alphabet (IPA)) and "aɪ æm ə bɔɪ" (i.e., the phonetic symbols into which the latter sentence is converted according to the IPA) as a weak pronunciation or pronunciation combination that the user fails to understand.

As another example, when "boy is clever" and "I am a boy" are determined as weak study sentences that the user fails to understand, the weak pronunciation determination unit 220 according to one embodiment of the invention may determine "0062 0254 026A" (i.e., "boy") that is commonly included in "0062 0254 026A 0020 026A 007A 0020 02C8 006B 006C 025B 0076 0259 0072" (i.e., the predetermined codes (i.e., Unicode corresponding to the phonetic symbols) of the former sentence) and "0061 026A 0020 00E6 006D 0020 0259 0020 0062 0254 026A" (i.e., the predetermined codes (i.e., Unicode corresponding to the phonetic symbols) of the latter sentence) as a weak pronunciation or pronunciation combination that the user fails to understand.

Further, the weak pronunciation determination unit 220 according to one embodiment of the invention may determine a pronunciation or pronunciation combination that is commonly included in the weak study sentences at a frequency equal to or greater than a predetermined level as a weak pronunciation or pronunciation combination.

For example, when pronunciation combinations A, B and C are commonly included in the weak study sentences three times, five times and ten times, respectively, the weak pronunciation determination unit 220 according to one embodiment of the invention may determine the pronunciation combinations B and C as weak pronunciations or pronunciation combinations, excluding the pronunciation combination A which is included under five times.

Next, the compensatory study course determination unit 230 according to one embodiment of the invention may function to refer to weak pronunciations or pronunciation combinations determined from the weak pronunciation determination unit 220, and determine a compensatory study course to be provided to the user. The compensatory study course according to one embodiment of the invention may be specified by at least one compensatory study material for compensating weak pronunciations or pronunciation combinations of the user, and a sequence in which the at least one compensatory study material is provided.

Specifically, the compensatory study course determination unit 230 according to one embodiment of the invention may determine at least one study material including the weak pronunciations or pronunciation combinations as a compensatory study material to be provided to the user.

For example, the compensatory study course determination unit 230 according to one embodiment of the invention may determine study materials each including a weak pronunciation or pronunciation combination (i.e., study materials for respective weak pronunciations or pronunciation combinations) as compensatory study materials to be provided to the user, and may determine a study material including all weak pronunciations or pronunciation combinations together as a compensatory study material to be provided to the user. That is, when "boy" and "girl" are determined as weak pronunciations or pronunciation combinations that the user fails to understand, the compensatory study course determination unit 230 according to one embodiment of the invention may determine compensatory study sentences, "There is a boy" including "boy" and "There is a girl" including "girl" as compensatory study materials to be provided to the user, respectively, and may determine a compensatory study sentence, "Boys live more than girls" including both "boy" and "girl" as a compensatory study material to be provided to the user.

As another example, the compensatory study course determination unit 230 according to one embodiment of the invention may refer to the determined weak pronunciations or pronunciation combinations, and determine at least one of a single study material including a single weak pronunciation (or pronunciation combination), an analogous study material in which a weak pronunciation (or pronunciation combination) is combined with a plurality of other weak pronunciations (or pronunciation combinations), and a weakness prediction study material determined based on a history of weak pronunciations or pronunciation combinations of the user (e.g., a study material in which the weak pronunciations or pronunciation combinations are combined with those determined from other assessment sentences) as a compensatory study material to be provided. More specifically, the compensatory study course determination unit 230 according to one embodiment of the invention may specify at least one of the single study material, the analogous study material, and the weakness prediction study material as a compensatory study material to be provided to the user, based on occurrence frequencies of the weak pronunciations or pronunciation combinations. For example, when the occurrence frequency of a weak pronunciation or pronunciation combination is equal to or greater than a predetermined level, the compensatory study course determination unit 230 according to one embodiment of the invention may determine a single study material for basic study of the weak pronunciation or pronunciation combination as a compensatory study material to be provided to the user.

Further, the compensatory study course determination unit 230 according to one embodiment of the invention may refer to the number of the determined weak pronunciations or pronunciation combinations, and determine a compensatory study material to be provided to the user.

Specifically, the compensatory study course determination unit 230 according to one embodiment of the invention may determine a compensatory study material to be provided to the user, according to the frequencies of the weak pronunciations or pronunciation combinations included in the determined weak study sentences.

For example, when the determined weak pronunciations or pronunciation combinations are A, B and C, and the frequencies of inclusion of A, B and C in the determined weak study sentences are three times, five times and ten times, respectively, the compensatory study course determination unit 230 according to one embodiment of the invention may determine a study material in which study materials associated with the pronunciation combinations A, B and C are included at a ratio of 3:5:10, as a compensatory study material to be provided to the user.

Further, the compensatory study course determination unit 230 according to one embodiment of the invention may refer to weak pronunciations or pronunciation combinations determined from other assessment study sentences, and determine a compensatory study material to be provided to the user.

Specifically, the compensatory study course determination unit 230 according to one embodiment of the invention may refer to how many times (or how frequently) a weak pronunciation or pronunciation combination is determined to be a weak pronunciation or pronunciation combination in other assessment study sentences, and determine a compensatory study material to be provided to the user.

For example, when the frequency at which a weak pronunciation or pronunciation combination is determined to be a weak pronunciation or pronunciation combination in other assessment study sentences is equal to or greater than a predetermined level, the compensatory study course determination unit 230 according to one embodiment of the invention may specify a single study material as a compensatory study question. Further, the compensatory study course determination unit 230 according to one embodiment of the invention may specify a weakness prediction study material as a compensatory study question when the frequency is less than another predetermined level, and specify an analogous study material as a compensatory study question when the frequency is between the predetermined levels.

Further, the compensatory study course determination unit 230 according to one embodiment of the invention may refer to the determined weak pronunciations or pronunciation combinations, and determine a sequence in which compensatory study materials are provided.

Specifically, the compensatory study course determination unit 230 according to one embodiment of the invention may refer to linguistic (or phonetic) elements or correlations regarding the determined weak pronunciations or pronunciation combinations, and determine a sequence in which compensatory study materials are provided.

For example, the compensatory study course determination unit 230 according to one embodiment of the invention may determine a sequence of compensatory study materials to be provided, such that suprasegmental phonemes such as a stress, a pitch, and a pause are gradationally included in study materials associated with the determined weak pronunciations or pronunciation combinations. That is, since the level of difficulty is increased when suprasegmental phonemes are included, the compensatory study course determination unit 230 according to one embodiment of the invention may determine a sequence of compensatory study materials to be provided, such that the numbers of suprasegmental phonemes included in the compensatory study materials are gradationally increased.

As another example, when the determined weak pronunciations or pronunciation combinations are a front vowel (which is realized in a region where a tongue surface and a palate meet each other, and includes "ㅣ" and "ㅔ‖" in Korean and "/i/" and "/e/" in English, for example) and a high vowel (which is realized when a tongue rises the highest, and includes "ㅣ" and "ㅜㅣ" in Korean and "/i/" and "/u/" in English, for example), the compensatory study course determination unit 230 according to one embodiment of the invention may determine a sequence of compensatory study materials to be provided, such that compensatory study materials each including the weak front or high vowel are first provided, and then compensatory study materials including both the weak front and high vowels are provided.

As yet another example, the compensatory study course determination unit 230 according to one embodiment of the invention may determine a sequence of compensatory study materials to be provided, such that compensatory study materials each including phonemes, syllables, morphemes, words, phrases, clauses, sentences, and paragraphs for the weak pronunciations are provided in that order.

Further, the compensatory study course determination unit 230 according to one embodiment of the invention may refer to frequencies of the determined weak pronunciations or pronunciation combinations, and determine a sequence in which compensatory study materials are provided to the user.

Specifically, the compensatory study course determination unit 230 according to one embodiment of the invention may determine a sequence of compensatory study materials to be provided, in order of frequencies of the determined weak pronunciations or pronunciation combinations, such that compensatory study materials associated with the weak pronunciations or pronunciation combinations having higher frequencies are priory provided.

Meanwhile, the compensatory study course determination unit 230 according to one embodiment of the invention may refer to a result of machine learning or deep learning performed on weak pronunciations or pronunciation combinations of each user and compensatory study materials for the user, and determine a sequence of compensatory study materials to be provided to the user.

For example, when a specific compensatory study material is provided for weak pronunciations or pronunciation combinations of a specific user, or when the weak pronunciations or pronunciation combinations are less frequently determined as weak pronunciations or pronunciation combinations after compensatory study materials are provided in a specific sequence, the compensatory study course determination unit 230 according to one embodiment of the invention may determine a sequence of compensatory study materials to be provided, such that the specific compensatory study material is priory provided or the compensatory study materials are provided in the specific sequence.

Next, the communication unit 240 according to one embodiment of the invention may function to enable data transmission/reception from/to the weak study sentence determination unit 210, the weak pronunciation determination unit 220, and the compensatory study course determination unit 230.

Lastly, the control unit 250 according to one embodiment of the invention may function to control data flow among the weak study sentence determination unit 210, the weak pronunciation determination unit 220, the compensatory study course determination unit 230, and the communication unit 240. That is, the control unit 250 according to the invention may control data flow into/out of the learning assistance system 200 or data flow among the respective components of the learning assistance system 200, such that the weak study sentence determination unit 210, the weak pronunciation determination unit 220, the compensatory study course determination unit 230, and the communication unit 240 may carry out their particular functions, respectively.

Figure 3:
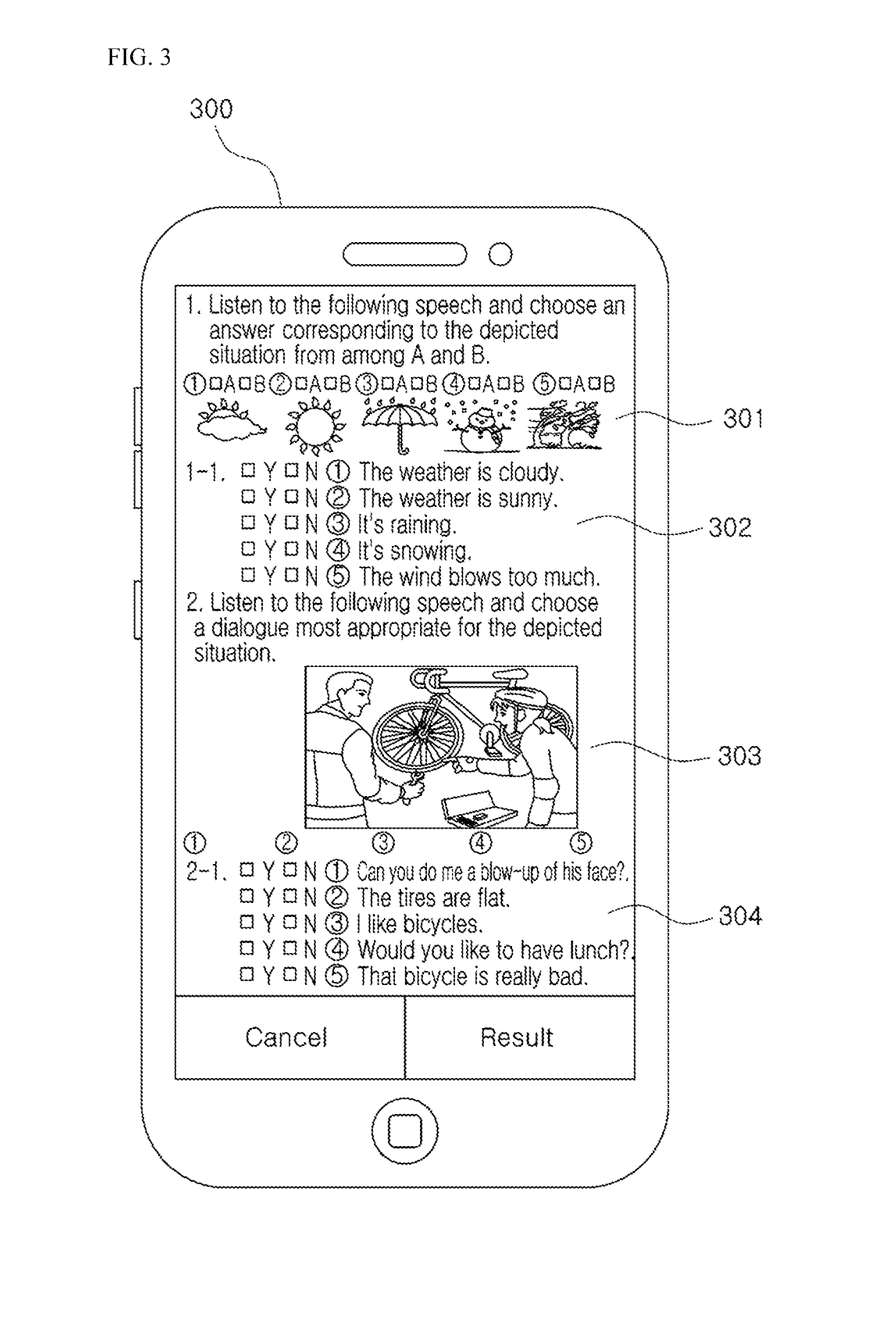
FIG. 3 illustratively shows a user interface provided through a learning assistance system according to one embodiment of the invention.

FIG. 3 illustratively shows a user interface provided through the learning assistance system 200 according to one embodiment of the invention.

Referring to FIG. 3, it may be assumed that the learning assistance system 200 according to one embodiment of the invention assists a user's listening study through the user device 300.

First, the learning assistance system 200 according to one embodiment of the invention may provide speech of English assessment study sentences (e.g., TOEFL and TOEIC listening questions) to the user device 300, together with question/answer items 301, 303 for the speech. Further, after providing the English assessment study sentences by speech, the learning assistance system 200 according to one embodiment of the invention may provide the user device 300 with texts 302, 304 of the English assessment study sentences corresponding to the speech, in order to determine again whether the user understands the sentences.

Next, the learning assistance system 200 according to one embodiment of the invention may determine a plurality of weak study sentences that the user fails to understand, based on the user's feedback (i.e., answers to 301, 302, 303, and 304). When it is determined that the user understands the English assessment study sentences in the question/answer items 301, 303 but fails to understand the corresponding sentences in the English assessment study sentences 302, 304 provided by text, the learning assistance system 200 according to one embodiment of the invention may determine the weak study sentences that the user fails to understand, preferentially based on the latter 302, 304. That is, the learning assistance system 200 according to one embodiment of the invention may determine that the user fails to understand a first sentence, when receiving feedback that the user understands the first sentence in question #1 but fails to understand the first sentence in question #1-1.

Next, the learning assistance system 200 according to one embodiment of the invention may determine at least some of pronunciations or pronunciation combinations commonly included in the plurality of weak study sentences as weak pronunciations or pronunciation combinations that the user fails to understand. According to one embodiment of the invention, when sentence #5 in question #1 (301), sentence #5 in question #1-1 (302), sentence #1 in question #2 (303), and sentence #1 in question #2-1 (304) are determined as weak study sentences, the pronunciation combination "blow" commonly included in the weak study sentences may be determined as a weak pronunciation combination.

Next, the learning assistance system 200 according to one embodiment of the invention may determine a compensatory study course (i.e., compensatory study materials and a sequence in which the materials are provided) to be provided to the user device 300, in which study materials regarding phonemes including the weak pronunciations or pronunciation combinations ("blow" in the above case), those regarding syllables including the weak pronunciations or pronunciation combinations ("blow" in the above case), and those regarding morphemes including the weak pronunciations or pronunciation combinations ("blow" in the above case) are provided in that order.

The embodiments according to the invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be configured to operate as one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a system for assisting listening study, the system comprising a microprocessor, and the method comprising the steps of:
   by the microprocessor, instructing a device of a user to output an audible sound of assessment study sentences and receive first feedback from the user;
   by the microprocessor, instructing a screen of the device to display the assessment study sentences by text and receive second feedback from the user;
   by the microprocessor, determining a plurality of weak study sentences that the user fails to understand, with reference to the first feedback and the second feedback from the user;
   by the microprocessor, converting each of the plurality of weak study sentences to a set of predetermined codes, wherein converting each of the plurality of weak study sentences to a set of predetermined codes includes converting each of the plurality of weak study sentences into phonetic symbols, and converting each of the phonetic symbols to a series of Unicodes;

by the microprocessor, determining at least some of pronunciations or pronunciation combinations commonly included in the plurality of weak study sentences as weak pronunciations or pronunciation combinations that the user fails to understand by identifying one or more predetermined codes that are included in each of the sets of predetermined codes; and by the microprocessor, determining a compensatory study course to be provided to the user, with reference to the determined weak pronunciations or pronunciation combinations, wherein in the step of determining a plurality of weak study sentences, an assessment study sentence is determined as a weak study sentence when it is determined with reference to the second feedback that the user fails to understand the assessment study sentence even if it is determined with reference to the first feedback that the user understands the assessment study sentence, wherein in the step of determining a compensatory study course, the compensatory study course is specified by at least one compensatory study material associated with the weak pronunciations or pronunciation combinations, and a sequence in which the at least one compensatory study material is provided, wherein in the step of determining a compensatory study course, the sequence in which the at least one compensatory study material is provided is determined with reference to linguistic or phonetic elements regarding the weak pronunciations or pronunciation combinations or correlations between the elements, wherein the step of determining the compensatory study course comprises determining a frequency of inclusion of each of the weak pronunciations or pronunciation combinations in the plurality of weak study sentences, determining a ratio for the weak pronunciations or pronunciation combinations based on the frequencies, and determining the compensatory study course including the weak pronunciations or pronunciation combinations at the ratio, and wherein in the step of determining weak pronunciations or pronunciation combinations, pronunciations or pronunciation combinations that are commonly included in the plurality of weak study sentences at frequencies equal to or greater than a predetermined level are determined as the weak pronunciations or pronunciation combinations.

2. The method of claim 1, wherein in the step of determining a plurality of weak study sentences, each of the plurality of weak study sentences is structured by predetermined codes representing pronunciations or pronunciation combinations included in each of the plurality of weak study sentences.

3. The method of claim 1, wherein in the step of determining a compensatory study course, a compensatory study material associated with the determined weak pronunciations or pronunciation combinations is determined.

4. The method of claim 3, wherein the compensatory study material includes at least one of a single study material, an analogous study material, and a weakness prediction study material.

5. A non-transitory computer-readable recording medium having stored thereon a computer program for executing the method of claim 1.

6. The method of claim 1, wherein the assessment study sentences by text is displayed by the screen of the device after the microprocessor receives the first feedback.

7. The method of claim 1, further comprising:
instructing the device of the user to output the audible sound of assessment study sentences and display one or more images related to the assessment study sentences; and
instructing the screen of the device to display the assessment study sentences by text adjacent to the one or more images.

8. A system for assisting listening study, comprising:
a microprocessor configured to:
instruct a device of a user to output an audible sound of assessment study sentences and receive first feedback from the user;
instruct a screen of the device to display the assessment study sentences by text and receive second feedback from the user;
determine a plurality of weak study sentences that the user fails to understand, with reference to the first feedback and the second feedback from the user;
convert each of the plurality of weak study sentences to a set of predetermined codes, wherein the microprocessor converts each of the plurality of weak study sentences into phonetic symbols, and converts each of the phonetic symbols to a series of Unicodes; and
determine at least some of pronunciations or pronunciation combinations commonly included in the plurality of weak study sentences as weak pronunciations or pronunciation combinations that the user fails to understand by identifying one or more predetermined codes that are included in each of the sets of predetermined codes;
determine a compensatory study course to be provided to the user, with reference to the determined weak pronunciations or pronunciation combinations,
wherein the microprocessor is configured to determine an assessment study sentence as a weak study sentence when it is determined with reference to the second feedback that the user fails to understand the assessment study sentence even if it is determined with reference to the first feedback that the user understands the assessment study sentence,
wherein the microprocessor is configured to specify the compensatory study course by at least one compensatory study material associated with the weak pronunciations or pronunciation combinations, and a sequence in which the at least one compensatory study material is provided,
wherein the microprocessor is configured to determine the sequence in which the at least one compensatory study material is provided with reference to linguistic or phonetic elements regarding the weak pronunciations or pronunciation combinations or correlations between the elements,
wherein the microprocessor determines a frequency of inclusion of each of the weak pronunciations or pronunciation combinations in the plurality of weak study sentences, determines a ratio for the weak pronunciations or pronunciation combinations based on the frequencies, and determines the compensatory study course including the weak pronunciations or pronunciation combinations at the ratio, and
wherein the microprocessor determines pronunciations or pronunciation combinations that are commonly included in the plurality of weak study sentences at frequencies equal to or greater than a predetermined level as the weak pronunciations or pronunciation combinations.

\* \* \* \* \*